United States Patent Office.

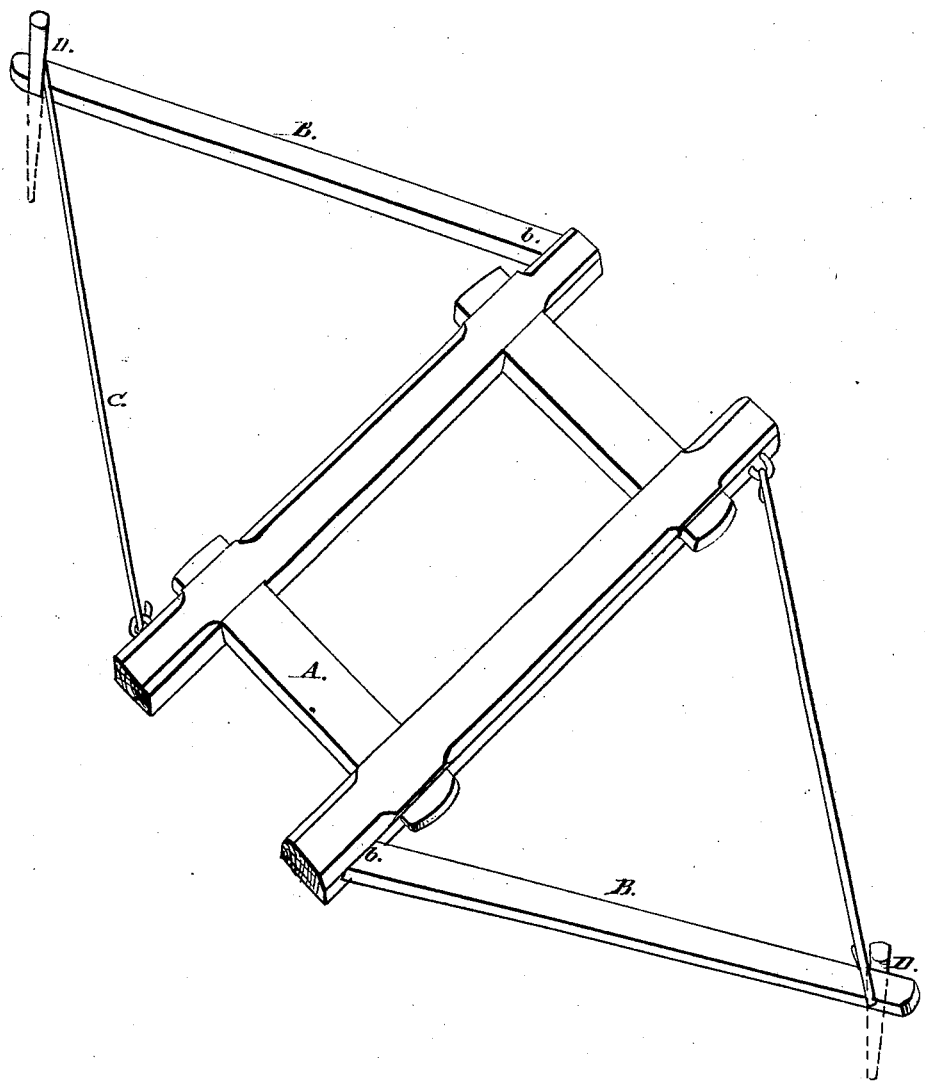

FRANCIS W. RANDALL, OF BURLINGTON, ASSIGNOR TO IRA B. BUELL, OF UNION, MICHIGAN.

Letters Patent No. 101,507, dated April 5, 1870.

IMPROVEMENT IN MODE OF SECURING HORSE-POWERS TO THE GROUND.

The Schedule referred to in these Letters Patent and making part of the same.

I, FRANCIS W. RANDALL, of Burlington, in the county of Calhoun and State of Michigan, have invented certain Improvements in the Manner of Staking Down and Securing Portable Horse-Powers to the Ground, of which the following is a specification.

My invention relates to a combination of shores or braces and draw-rods or chains, connected with a portable horse-power frame subject to a twisting or torsional strain, the object and effect being to transfer the position of the resisting stakes to distant opposite points, and so diminish the lateral or torsional strain and pressure upon such stakes, as caused by the action of the power-sweeps.

The labor and time consumed in staking horse-powers (driven by sweeps) in the usual manner, which is by driving several long and stout stakes into the ground alongside of the frame, is very onerous, especially in frozen ground, or ground of a soft, friable nature, but by the use of my invention two stakes of moderate size are sufficient to keep the frame steady.

The drawing exhibits, in its simplest arrangement, the plan of my invention.

A is the horse-power frame.
B, the wooden braces or shores.
C, the draw-rods, or, in place thereof, chains.
D D are two stakes, driven into the ground.

The shores and rods are very well proportioned, if with the side of the frame they form the two sides of an equilateral triangle. I do not regard it as important, however, that this precise angle should be maintained, for it may be greater or lesser to some extent, and yet produce substantially the same effect.

I usually put a dowel-pin in the abutting-end $b$ of the brace B, or form a short tenon on the same, to insert in a hole or mortise in the frame, to hold the brace steady against its angular shoulder, and form a side-notch in the opposite end of the brace, to receive the hook of the draw-rod or chain.

The opposite ends of said rods or chains are also furnished with hooks, to hook into eye-bolts $e$ or staples, inserted into the horse-power frame, and for the sake of durability it may be advisable to place a metal band or shoe (not shown) on the outer end of each shore, into which eye-bolts may be inserted also, to take up the slack and protect the wood-work from abrasion; but these are mere details of construction, which in no way affect the application of the principle involved in my invention.

In the case of mounted horse-powers, the shores and rods may be connected with the frame in a similar manner, and slope to the ground at the staking-point, provided the trucks are not in the way, and, if they are, the arrangement may be diagonal with the frame, and connection made with the end-girts.

I claim as my invention—

The arrangement of the braces B and draw-rods or chains C, when arranged alternately in pairs, with a stake, D, driven into the ground at each apex or point of junction, in a manner to resist the torsional strain, and connected and combined with the frame A of a portable horse-power, (mounted or otherwise,) substantially as and for the purpose set forth.

FRANCIS W. RANDALL.

Witnesses:
G. S. WRIGHT,
GEORGE T. PHELPS.